(12) United States Patent
Ederer et al.

(10) Patent No.: US 7,665,636 B2
(45) Date of Patent: Feb. 23, 2010

(54) DEVICE FOR FEEDING FLUIDS

(76) Inventors: Ingo Ederer, Greifenbergerstrasse 6, D-86926 Pflaumdorf (DE); Stefan Hühn, Schmelzing-Strasse 29, D-86169 Augsburg (DE)

( * ) Notice: Subject to any disclaimer, the term of this patent is extended or adjusted under 35 U.S.C. 154(b) by 775 days.

(21) Appl. No.: 10/514,667

(22) PCT Filed: May 16, 2003

(86) PCT No.: PCT/DE03/01587

§ 371 (c)(1),
(2), (4) Date: Jun. 24, 2005

(87) PCT Pub. No.: WO03/097518

PCT Pub. Date: Nov. 27, 2003

(65) Prior Publication Data

US 2006/0175346 A1    Aug. 10, 2006

(30) Foreign Application Priority Data

May 20, 2002   (DE) ............................. 102 22 167

(51) Int. Cl.
*G01F 11/00* (2006.01)
(52) U.S. Cl. .................. 222/409; 222/1; 222/64; 222/161; 222/162; 222/181.2; 222/196; 222/380
(58) Field of Classification Search ......... 222/161–162, 222/52, 64, 196, 181.2, 185.1, 412–414, 222/DIG. 1, 409, 380, 372, 328, 1; 118/118
See application file for complete search history.

(56) References Cited

U.S. PATENT DOCUMENTS

| | | | | | |
|---|---|---|---|---|---|
| 143,613 | A | * | 10/1873 | Bucklin | 141/378 |
| 643,882 | A | * | 2/1900 | McClave | 222/309 |
| 951,665 | A | * | 3/1910 | Swindell | 414/198 |
| 1,356,837 | A | * | 10/1920 | Stegmaier | 222/92 |
| 1,421,896 | A | * | 7/1922 | Benedict | 222/200 |
| 1,535,341 | A | * | 4/1925 | Riley | 222/340 |
| 2,358,956 | A | * | 9/1944 | Ashbaugh | 222/372 |
| 2,388,805 | A | * | 11/1945 | Stahl | 222/372 |
| 2,390,154 | A | * | 12/1945 | Kessler | 198/642 |
| 2,640,629 | A | * | 6/1953 | Thomson et al. | 222/161 |
| 2,692,142 | A | * | 10/1954 | Hunter | 222/164 |

(Continued)

FOREIGN PATENT DOCUMENTS

DE        4300478 C1    8/1994

(Continued)

OTHER PUBLICATIONS

Cima et al., "Computer-derived Microstructures by 3D Printing: Bio- and Structural Materials," SFF Symposium, Austin, TX, 1994.

(Continued)

*Primary Examiner*—Frederick C. Nicolas
(74) *Attorney, Agent, or Firm*—Dobrusin & Thennisch PC

(57) ABSTRACT

The present invention relates to an apparatus for dispensing fluids, especially particulate matter, from a supply bin. The apparatus includes a plough that is movable at least partially in and out of the bin and which, when retracted, closes a matching aperture in the bin, whereby there is an adequate quantity of fluid above the plough.

14 Claims, 4 Drawing Sheets

U.S. PATENT DOCUMENTS

| | | | |
|---|---|---|---|
| 2,798,256 A * | 7/1957 | Eynard | 425/550 |
| 2,857,938 A * | 10/1958 | Wahl | 141/71 |
| 3,289,898 A * | 12/1966 | Herman | 222/263 |
| 3,377,001 A * | 4/1968 | Hazard | 222/263 |
| 3,616,969 A * | 11/1971 | Koizumi | 222/161 |
| 3,616,972 A * | 11/1971 | Christy | 222/247 |
| 3,722,747 A * | 3/1973 | Petit | 222/56 |
| 3,815,527 A * | 6/1974 | Dobbins | 111/11 |
| 3,913,503 A * | 10/1975 | Becker | 111/77 |
| 4,239,715 A | 12/1980 | Pratt | |
| 4,247,508 A | 1/1981 | Housholder | |
| 4,279,949 A | 7/1981 | Esser et al. | |
| 4,369,025 A | 1/1983 | von Der Weid | |
| 4,575,330 A | 3/1986 | Hull | |
| 4,579,252 A * | 4/1986 | Wilson et al. | 222/55 |
| 4,630,755 A * | 12/1986 | Campbell | 222/56 |
| 4,669,634 A * | 6/1987 | Leroux | 222/53 |
| 4,752,352 A | 6/1988 | Feygin | |
| 4,863,538 A | 9/1989 | Deckard | |
| 4,889,433 A * | 12/1989 | Pratt | 366/141 |
| 4,938,816 A | 7/1990 | Beaman et al. | |
| 4,944,817 A | 7/1990 | Bourell et al. | |
| 5,017,753 A | 5/1991 | Deckard | |
| 5,053,090 A | 10/1991 | Beaman et al. | |
| 5,076,869 A | 12/1991 | Bourell et al. | |
| 5,127,037 A | 6/1992 | Bynum | |
| 5,132,143 A | 7/1992 | Deckard | |
| 5,147,587 A | 9/1992 | Marcus et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,204,055 A | 4/1993 | Sachs et al. | |
| 5,221,539 A | 6/1993 | Pallerberg et al. | |
| 5,248,456 A | 9/1993 | Evans et al. | |
| 5,252,264 A | 10/1993 | Forderhase et al. | |
| 5,284,695 A | 2/1994 | Barlow et al. | |
| 5,296,062 A | 3/1994 | Bourell et al. | |
| 5,316,580 A | 5/1994 | Deckard | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,382,308 A | 1/1995 | Bourell et al. | |
| 5,387,380 A | 2/1995 | Cima et al. | |
| 5,431,967 A | 7/1995 | Manthiram et al. | |
| 5,433,520 A * | 7/1995 | Adams et al. | 366/8 |
| 5,482,659 A | 1/1996 | Sauerhoefer | |
| 5,490,962 A | 2/1996 | Cima et al. | |
| 5,518,680 A | 5/1996 | Cima et al. | |
| 5,573,055 A | 11/1996 | Melling et al. | |
| 5,597,589 A | 1/1997 | Deckard | |
| 5,601,868 A | 2/1997 | Gerhardt | |
| 5,616,294 A | 4/1997 | Deckard | |
| 5,639,070 A | 6/1997 | Deckard | |
| 5,647,931 A | 7/1997 | Retallick et al. | |
| 5,658,412 A | 8/1997 | Retallick et al. | |
| 5,730,925 A | 3/1998 | Wilkening et al. | |
| 5,753,274 A | 5/1998 | Wilkening et al. | |
| 5,807,437 A | 9/1998 | Sachs et al. | |
| 5,843,513 A * | 12/1998 | Wilke et al. | 426/646 |
| 5,851,465 A | 12/1998 | Bredt | |
| 5,902,441 A | 5/1999 | Bredt et al. | |
| 5,902,537 A | 5/1999 | Almquist et al. | |
| 5,934,343 A | 8/1999 | Gaylo et al. | |
| 5,943,235 A | 8/1999 | Earl et al. | |
| 5,965,170 A | 10/1999 | Matsuoka et al. | |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,094,994 A * | 8/2000 | Satake et al. | 73/861.73 |
| 6,116,517 A | 9/2000 | Heinz et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,193,922 B1 | 2/2001 | Ederer | |
| 6,217,816 B1 | 4/2001 | Tang | |
| 6,258,170 B1 | 7/2001 | Somekh et al. | |
| 6,316,060 B1 | 11/2001 | Elvidge et al. | |
| 6,322,728 B1 | 11/2001 | Brodkin et al. | |
| 6,375,874 B1 | 4/2002 | Russell et al. | |
| 6,401,001 B1 | 6/2002 | Jang et al. | |
| 6,403,002 B1 | 6/2002 | van der Geest | |
| 6,416,850 B1 | 7/2002 | Bredt et al. | |
| 6,423,255 B1 | 7/2002 | Hoechsmann et al. | |
| 6,436,334 B1 | 8/2002 | Hattori et al. | |
| 6,460,979 B1 | 10/2002 | Heinzl et al. | |
| 6,467,525 B2 | 10/2002 | Herreid et al. | |
| 6,500,378 B1 | 12/2002 | Smith | |
| 6,554,600 B1 | 4/2003 | Hofmann et al. | |
| 6,610,429 B2 | 8/2003 | Bredt et al. | |
| 6,733,528 B2 | 5/2004 | Abe et al. | |
| 6,830,643 B1 | 12/2004 | Hayes | |
| 6,838,035 B1 | 1/2005 | Ederer et al. | |
| 7,004,222 B2 | 2/2006 | Ederer et al. | |
| 7,204,684 B2 | 4/2007 | Ederer et al. | |
| 2001/0050031 A1 | 12/2001 | Bredt et al. | |
| 2002/0026982 A1 | 3/2002 | Bredt et al. | |
| 2004/0012112 A1 | 1/2004 | Davidson et al. | |
| 2004/0025905 A1 | 2/2004 | Ederer et al. | |
| 2004/0026418 A1 | 2/2004 | Ederer et al. | |
| 2004/0035542 A1 | 2/2004 | Ederer et al. | |
| 2004/0056378 A1 | 3/2004 | Bredt et al. | |
| 2004/0094058 A1 | 5/2004 | Kasperchik et al. | |
| 2004/0170765 A1 | 9/2004 | Ederer et al. | |
| 2005/0167872 A1 | 8/2005 | Ederer et al. | |
| 2006/0105102 A1 | 5/2006 | Hochsmann et al. | |
| 2006/0175346 A1 | 8/2006 | Ederer et al. | |

FOREIGN PATENT DOCUMENTS

| | | |
|---|---|---|
| DE | 4325573 | 2/1995 |
| DE | 29506204.5 | 4/1995 |
| DE | 4400523 | 7/1995 |
| DE | 4440397 | 9/1995 |
| DE | 29701279 | 1/1997 |
| DE | 19511772 C2 | 9/1997 |
| DE | 19723892 | 9/1998 |
| DE | 19853834 | 11/1998 |
| DE | 19846478 | 4/2000 |
| DE | 10047614 | 4/2002 |
| DE | 10117875 | 1/2003 |
| DE | 10216013 A1 | 10/2003 |
| EP | 0711213 B1 | 5/1995 |
| EP | 0361847 | 11/1995 |
| EP | 0431924 | 1/1996 |
| EP | 0739666 | 10/1996 |
| EP | 0688262 | 6/1999 |
| EP | 0734842 | 8/1999 |
| EP | 1163999 A2 | 5/2001 |
| EP | 0968 776 | 10/2002 |
| FR | 2790418 | 9/2000 |
| WO | WO 95/18715 | 7/1995 |
| WO | WO 96/05038 | 2/1996 |
| WO | WO 00/03324 | 1/2000 |
| WO | WO 00/21736 | 4/2000 |
| WO | WO 01/26885 | 4/2001 |
| WO | WO 01/72502 A1 | 4/2001 |
| WO | WO 01/34371 | 5/2001 |
| WO | WO 02/26419 | 4/2002 |
| WO | WO 02/26420 | 4/2002 |
| WO | WO 02/26478 | 4/2002 |
| WO | WO 02/28568 | 4/2002 |
| WO | WO 02/064353 | 8/2002 |
| WO | WO 02/064354 | 8/2002 |

| WO | WO 02/083323 | 10/2002 |
| WO | WO 03/016030 | 2/2003 |
| WO | WO 03/086726 | 10/2003 |
| WO | WO 03/097518 | 11/2003 |
| WO | WO 03/103932 A1 | 12/2003 |
| WO | WO 2004/112988 | 12/2004 |
| WO | WO 2005/080010 | 9/2005 |
| WO | WO 2005/113219 | 12/2005 |

OTHER PUBLICATIONS

Copending National Phase Application, WO 02/26419, Apr. 4, 2002.
Copending National Phase Application, WO 02/26420, Apr. 4, 2002.
Copending National Phase Application, WO 02/26478, Apr. 4, 2002.
Copending National Phase Application, WO 02/28568, Apr. 11, 2002.
Copending National Phase Application, WO 02/083323, Oct. 24, 2002.
Copending National Phase Application, WO 03/086726, Oct. 17, 2005.
Copending National Phase Application, WO 04/112988, Dec. 8, 2005.
Copending National Phase Application, WO 05/113219, Dec. 1, 2005.
Copending U.S. Appl. No. 11/767,778, filed Jun. 25, 2007.
EOS Operating Manual for Laser Sintering Machine with Brief Summary.
Gephart, Rapid Prototyping, pp. 118-119, 1996.
International Search Report, PCT/DE00/03324, Jun. 5, 2001.
International Search Report, PCT/DE01/03661, Feb. 28, 2002.
International Search Report, PCT/DE01/03662, Mar. 1, 2002.
International Search Report, PCT/DE02/01103, Sep. 30, 2002.
International Search Report, WO 04/110719, Jan. 11, 2005.
Marcus et al., Solid Freedom Fabrication Proceedings, Nov. 1993.
Opposition of Patent No. DE10047614, Jun. 25, 2003.
Opposition to European Patent No. 1322458 B1, Jan. 19, 2005.
Sachs et al., "Three-Dimensional Printing: Rapid Tooling and Prototypes Directly from a CAD Model", Massachusetts Institute of Technology, pp. 143-151.
Sachs et al., "Three-Dimensional Printing: Rapid Tooling and Prototypes Directly from a CAD Model", Massachusetts Institute of Technology, pp. 131-136.
Williams, "Feasibility Study of Investment Casting Pattern Design by Means of Three Dimensional Printing", Department of Machanical Enginerring, pp. 2-15, Jun. 5, 1989.
Jacobs et al., 2005 SME Technical Paper, title Are QuickCast Patterns Suitable for Limited Production, 2005.
Feature Article—Rapid Tooling—Cast Resin and Sprayed Metal Tooling by Joel Segal, Apr. 2000.
Marcus, et al., Solid Freeform Fabrication Proceedings, Sep. 1995, p. 130-33.
US 4,937,420, 06/1990, Deckard (withdrawn)

* cited by examiner

DEVICE FOR FEEDING FLUIDS

CLAIM OF BENEFIT OF FILING DATE

The present application claims the benefit of the filing date of PCT Application Ser. No. PCT/DE03/01587, (filed May 16, 2003) (published as WO 03/097518) and DE 102 22 167.7 (filed May 20, 2002), the contents of which are hereby incorporated by reference in their entirety.

FIELD OF INVENTION

This invention relates to an apparatus for dispensing fluids, especially particulate matter from a supply bin, comprising a plough that is movable at least partially in and out of said bin and which when retracted closes a matching aperture in this bin, whereby there is an adequate quantity of fluid above the plough.

BACKGROUND

This invention relates to an apparatus for dispensing fluids, especially particulate matter from a supply bin, and to the application of such an apparatus.

The ability to dispense fluids and especially particulate matter in thin layers on to a carrier is of major importance in many technological fields, where it is necessary for the fluid in a supply bin to be dispensed to a metering device. For example, the dispensing of fluids plays an important role in rapid prototyping processes.

Rapid prototyping for pattern building is known, for instance, through German patent application DE 198 53 834 directed at dispensing untreated particulate matter in a thin layer on to a working surface, whereafter the finest possible layer of a binder is sprayed all over the particles, followed by a curing agent appropriately metered and applied to bond selected areas of the particulate matter. Repeating this procedure several times enables a specific pattern of bonded particulate matter to be produced.

A method for dispensing fluids is know from a patent application filed subsequently by the applicant, whereby the fluid is fed through the bottom outlet of a container vibrated cooperatively with a blade, which imparts either rotary vibrations or vertical oscillations.

This method can be implemented preferably with an apparatus for dispensing fluids on to a surface to be coated, comprising a blade traversing along the surface and a metering device arranged in front of the blade, whereby the metering device dispenses fluids on to said surface swept across thereafter by the blade, which is affixed in a manner such that it can impart vibrations. The metering device is arranged as a hopper carrying the particulate matter, has a bottom outlet, and is vibrated cooperatively with the blade, whereby the hopper carries a supply of particulate matter adequate to cover at least one coating sweep over the full length of the working surface.

For such a device, the key requirement for the dispensing system is that the particulate matter be distributed uniformly when fed into the hopper of a metering device.

Precisely such relatively precise metering of a specific quantity of particulate matter over a defined length has been found to be difficult, when the particulate matter tends to agglomerate, as in this case.

In the state of the art, it is known how to dispense particulate matter into a metering device with means such as sets of impellers or conveyors. However, such conveying means cannot handle applications involving particulate matter that tends to agglomerate.

A further disadvantage of supply bins known in the state of the art is that fluids or particulate matter such as sand tend to arch or bridge, thereby hindering subsequent flow of the fluid and interrupting the dispensing of a desired quantity of particulate matter into the metering device. Such a situation is very undesirable in that an inadequate quantity of the fluid is consequently dispensed and thus, for instance, under certain circumstances defects may occur in the pattern being built.

Hence it is the object of this invention to provide an apparatus with which the fluid can be metered relatively precisely over a defined length.

SUMMARY

In accordance with the invention, this requirement is fulfilled with an apparatus for dispensing fluids, especially particulate matter from a supply bin, comprising a plough that is movable at least partially in and out of said bin and which when retracted closes an appropriate aperture in this bin, whereby there is an adequate quantity of fluid and above the plough. The size of the plough is selected to match the requirements of how much particulate matter is to be dispensed and the size of the respective dispensing area.

In accordance with the invention, the mechanism of the plough, which fits into a specially formed supply bin, is relatively simple and consequently little effort is needed to construct it.

Furthermore, this invention permits very rapid metering, whereby it is possible to also make multiple sweeps with the plough to be able to meter a larger quantity of particulate matter.

Another advantage of the apparatus in accordance with the invention is that it is very easy to clean, and may also be rinsed out with particulate matter.

In a rapid prototyping process, the width of a coater that is to be fed with particulate matter is matched to the width of the working surface. For applications of the apparatus in accordance with the invention, it is thus advantageous if the supply bin and the plough also extend essentially across the entire width of the coater.

Accordingly, the plough for example, could be shaped like a very long plate that essentially extends over the width of the supply bin. With such an apparatus it is possible to guaranty dispensing the particulate matter uniformly over a large width, for example along the entire width of the complete working surface of an apparatus to build patterns.

In a preferred embodiment of the invention, above the matching aperture of the supply bin is a gate adjustable in a direction vertical to the longitudinal axis of the aperture, arranged such that the area of the aperture perpendicular to the discharging fluid can be selectively changed to influence the quantity and uniformity of the discharged fluid. This quantity can be adjusted fully or over the entire length, and with this gate it is thus a simple matter to finely adjust the quantity of fluid discharged.

Pneumatic means, for example, could be used to move the plough in and out of the supply bin and for the plough to close the matching aperture in its retracted position, and such in and out movement could also be accomplished with any conceivable means, including an electric motor.

Since there is an adequate quantity of particulate matter above the plough, the apparatus in accordance with the invention functions such that as the plough protracts outwards, the gap accordingly created is filled with sand. In a preferred embodiment of the invention, the supply bin walls could be shaped to slant inwards for preventing any bridging within the particulate matter.

In addition, it is also possible that the embodiment of the invention is arranged with a mechanical vibrator as a flow inducer to dislodge any fluid that may hang up in the supply bin.

It is preferable to have a fluid conveying means arranged above the supply bin to feed fluid into the supply bin, whereby the conveying means preferably has a slotted conveyor pipe enclosing a screw conveyor.

When the screw conveyor rotates, the supply bin is filled via the slot from the supply side. The filling is done bottom up and from the supply side to the opposing end. If the fluid level contacts the conveyor pipe, filling in the vertical direction is stopped at that specific location.

In a preferred embodiment of the invention, a level detector is arranged in the supply bin to avoid overfilling the bin and to trigger the screw conveyor into motion.

In the apparatus in accordance with the invention, the supply bin is advantageously arranged above a metering device in a pattern building apparatus.

In an especially preferred embodiment of the invention, when viewed in the direction of feed, below the supply bin is a metering device in a coating apparatus with which fluid can be dispensed on to an area to be coated.

When the plough is protracted outwards, the space previously occupied by the plough in the supply bin will be filled by an equivalent quantity of fluid. However, if the supply bin's aperture is appropriately dimensioned, no fluid will flow out because the fluid forms an angle of repose in the aperture that prevents free flow of fluid out of the supply bin. Only when the plough is retracted thereafter into the supply bin does the fluid flow out of the respective aperture.

The apparatus in accordance with this invention is especially suited for metering particulate matter comprising a binder, for example in a method to build casting patterns and molds.

This applies equally to a method of coating with particulate matter that tends to agglomerate.

As described earlier, this apparatus is especially suited for selective discharge of a predetermined quantity of fluid along a straight line.

Other advantageous arrangements of this invention are evident from the subclaims and description.

BRIEF DESCRIPTION OF THE DRAWINGS

Preferred embodiments of the invention are described below in more detail with the help of the accompanying drawings.

In the drawings.

DESCRIPTION OF THE INVENTION

Examples of the apparatus in accordance with the invention are illustrated below for use in rapid prototyping applications to build patterns in layers from particulate matter, binders, and curing agents, as has already been described in the patent application filed subsequently by the applicant.

In particular, it is assumed that the particulate matter comprises a binder that tends to lump easily, whereby great demands are placed on the coating process and on feeding the coater.

The application of such particulate matter is advantageous in rapid prototyping, since the step normally required to coat the particulate matter with a binder is eliminated and patterns can be built up faster and cheaper.

Not only particulate matter comprising a binder but also materials with grain sizes under 20 µm and wax powders tend to agglomerate easily, such that the method in accordance with the invention is especially advantageous when applied to fluids.

The coating sequence for a preferred embodiment of the method in accordance with the invention is described below in more detail with the help of FIG. 1.

Figure 1:
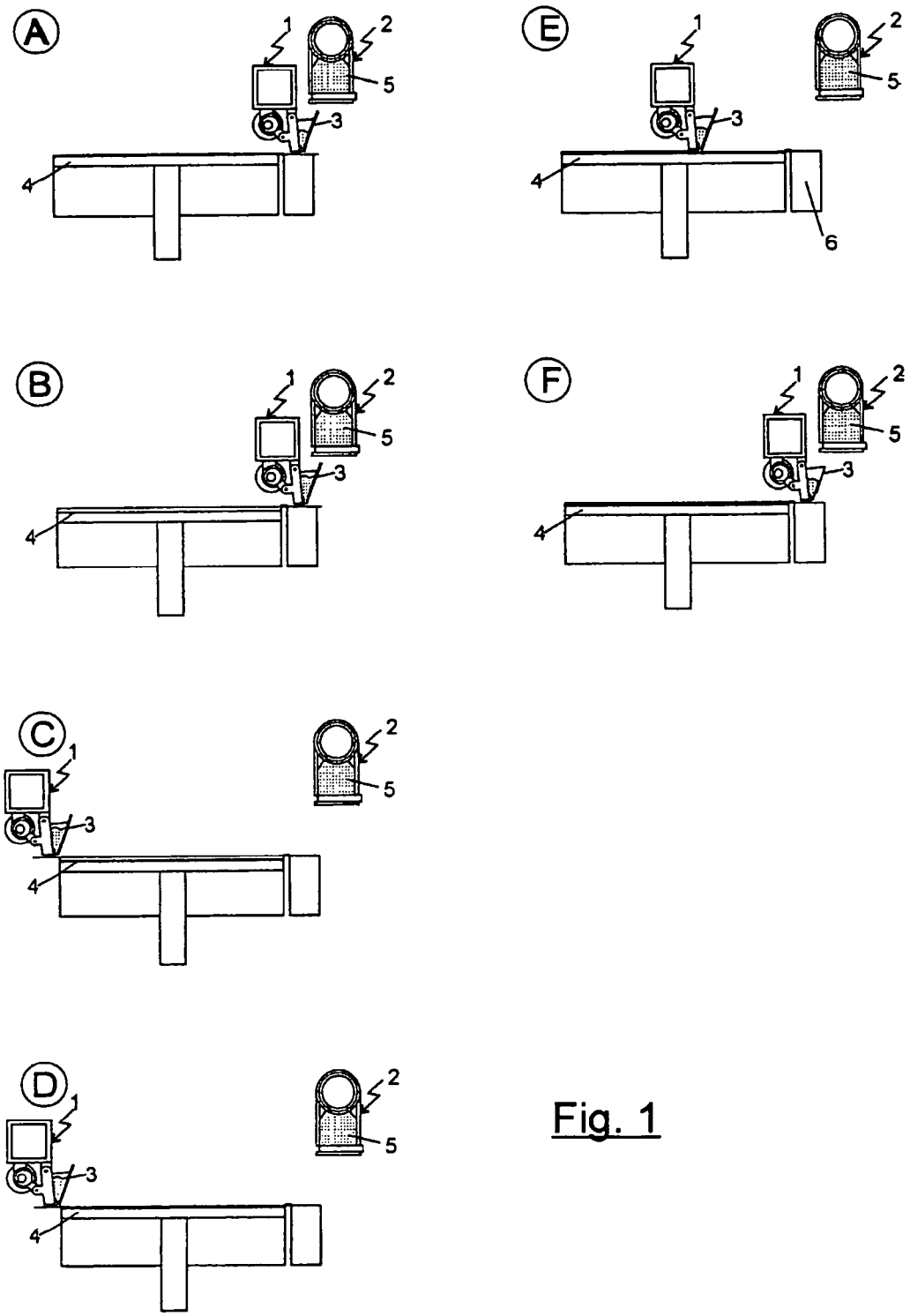
FIG. 1 shows the coating sequence for dispensing fluid with an apparatus in accordance with the invention.

FIG. 1 is an exemplary depiction of a method to build a part such as a casting pattern. Working surface 4 on which the mold is to be built is lowered by one layer thickness of particulate matter 5, whereafter the desired layer thickness of particulate matter 5 like quartz sand comprising a binder, for example, is dispensed from a container, in this case hopper 3, on to working surface 4. This step is followed by selective dispensing of the curing agent on areas to be hardened, through for example a drop-on-demand system like that of an ink-jet printer. These dispensing steps are repeated until a finished part embedded in loose particulate matter 5 is obtained.

To start, coater 1 is located at the filling position depicted in FIG. 1A, where it is first filled up by filling device 2 in accordance with the invention, when the level indicator senses a low quantity in the metering container, shown here as hopper 3.

As depicted in FIG. 1B, working surface 4 is subsequently lowered by more than one layer thickness to build the pattern.

Thereafter, as shown in FIG. 1C, coater 1 traverses without oscillating and thus without feeding any material to a position across from filling device 2 until it is located past the edge of working surface 4.

As is apparent from FIG. 1D, working surface 4 is now raised precisely to a level such that the slot between working surface 4 and the coating blade is equal to exactly one layer thickness.

As depicted in FIG. 1E, coater 1 now starts oscillating and sweeps steadily across working surface 4, which it coats by dispensing the proper quantity of particulate matter 5.

Coater 1 thus ends up at its starting position again and can be refilled with filling device 2, if necessary, as illustrated in FIG. 1F that is similar to FIG. 1A.

Figure 2:
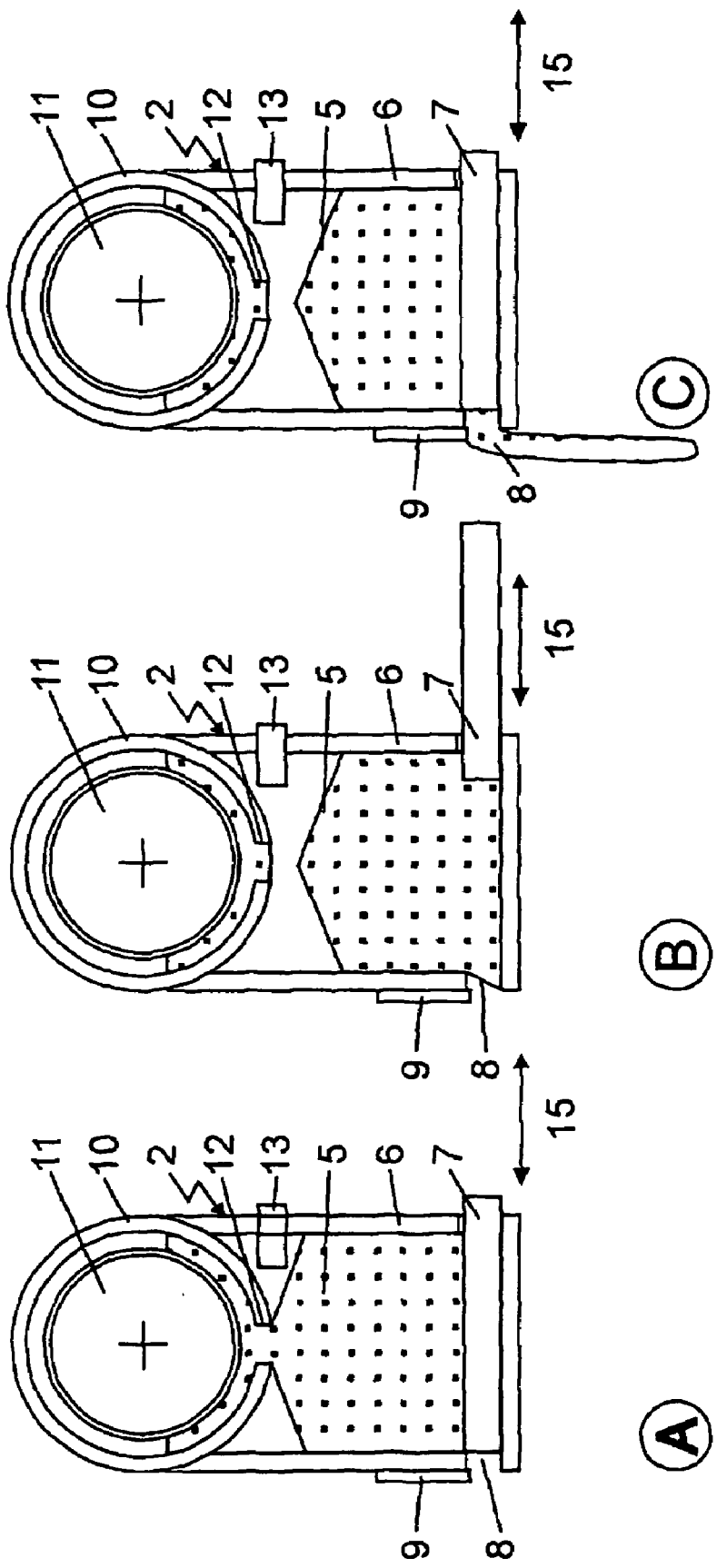
FIG. 2 shows a more detailed view of an apparatus in accordance with the invention.

FIG. 2 is a more detailed view of filling device 2 in accordance with the invention, whereby this device and coater 1 extend essentially across the entire width of working surface 4. FIG. 2 illustrates that filling device 2 comprises a supply bin 6 containing the fluid, which in this case is particulate matter 5.

Furthermore, plough 7 is arranged to extend through supply bin 6 such that it can be moved at least partially in and out of supply bin 6, as indicated by arrow 15.

As depicted in FIG. 2A, in its retracted position plough 7 closes a matching aperture 8 in supply bin 6, and there is an adequate quantity of particulate matter 5 above plough 7.

In accordance with the preferred embodiment illustrated, plough 7 is moved pneumatically in and out of supply bin 6, whereby in its retracted position it closes the matching aperture 8 in supply bin 6.

As shown in FIG. 2B, when plough 7 is protracted in a direction out of supply bin 6, particulate matter 5 falls into the space now created and which had previously been occupied by plough 7.

In order to prevent bridging of the particulate matter when it drops down, the walls of supply bin 6 are shaped to slant inwards, but this is not apparent from the figure.

Furthermore, supply bin 6 comprises a vibrator, but this device that is operated during metering is not visible in FIG. 2.

At the protracted position of the plough 7 shown in FIG. 2B, when it has been moved out from supply bin 6 and when it no longer closes aperture 8, it was surprisingly found that particulate matter 5 does not flow out of aperture 8, because it is sealed adequately by the angle of repose of particulate matter 5 that forms.

As illustrated in FIG. 2C, a certain quantity of particulate matter 5 is forced out of aperture 8 only after plough 7 is retracted into supply bin 6, whereby the quantity of particulate matter 5 forced out can be adjusted fully or along the length of aperture 8 by either closing or partially opening gate 9 arranged in front of aperture 8.

In accordance with a preferred embodiment, above supply bin 6 is conveyor pipe 10 with a longitudinal slot in the material dispensing direction, and which comprises screw conveyor 11.

When screw conveyor 11 rotates, supply bin 6 is filled from the supply side via slot 12 in conveyor pipe 10. The filling occurs bottom up as well as from the supply to the opposing side. If the level of particulate matter 5 contacts conveyor pipe 10, filling in the vertical direction is stopped at that specific location. In order to prevent overfilling supply bin 6, it is only necessary to arrange level detector 13 at the end across from the supply side, whereby screw conveyor 11 is set into motion when triggered accordingly by detector 13.

Figure 3:
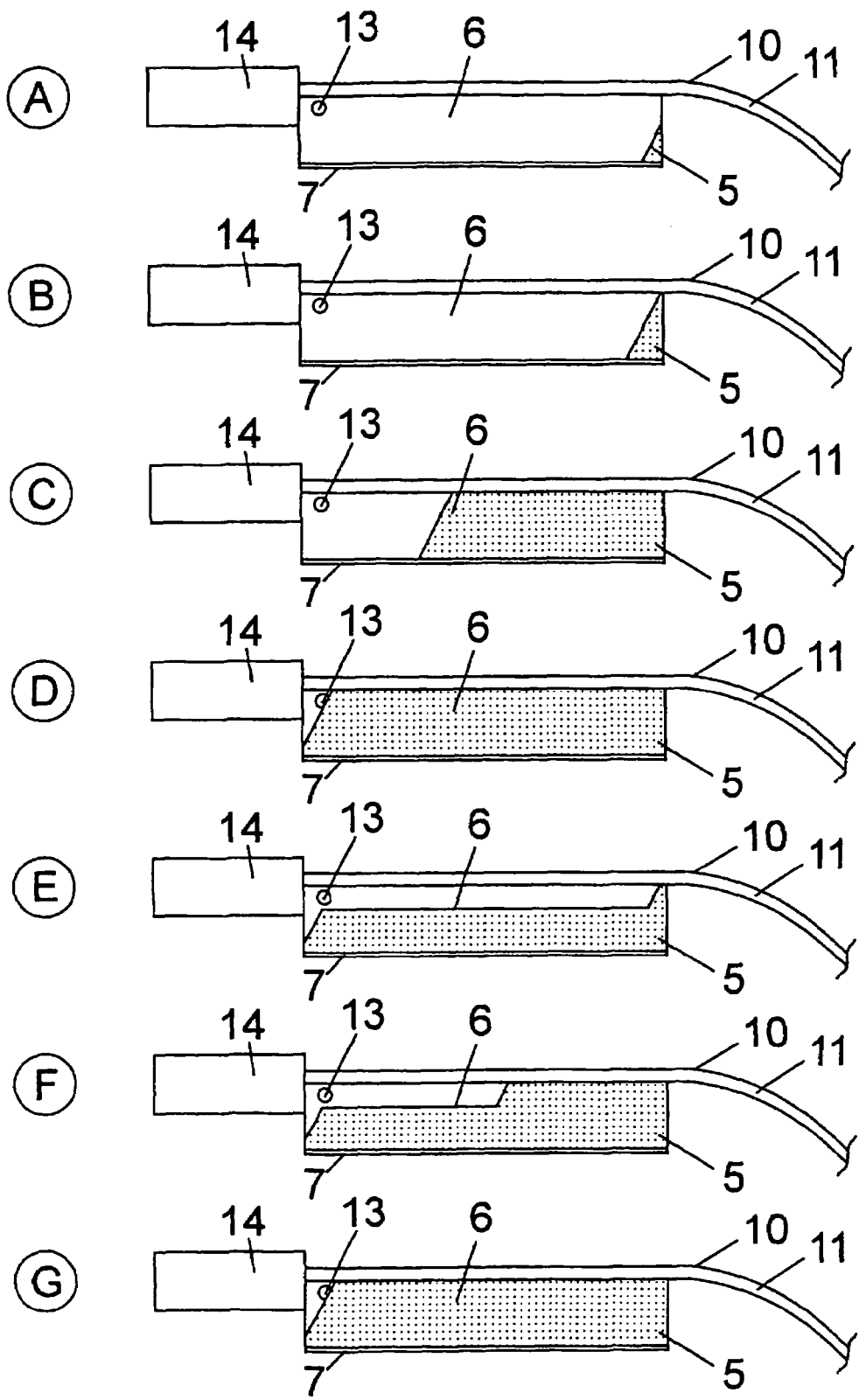
FIG. 3 depicts the method for filling the apparatus in accordance with the invention.

The filling of supply bin 6 is depicted more clearly in FIG. 3.

Above the upper edge of supply bin 6 is an arrangement with conveyor pipe 10 comprising screw conveyor 11 that feeds particulate matter 5 from its storage tank to supply bin 6. As explained earlier, conveyor pipe 10 has a longitudinal slot above supply bin 6, such that the quantity of particulate matter 5 conveyed falls down out of conveyor pipe 10 through slot 12 into supply bin 6, where it forms an angle of repose in the conveying direction running from left to right and vice versa.

As is clearly evident from FIG. 3, supply bin 6 is first filled only along its edge from the inlet side of screw conveyor 11, and as soon the full height of the bin is reached, the particulate bulk material starts its sideways movement.

A level indicator 13 is arranged on the other end of supply bin 6, to ensure that as soon as particulate matter 5 reaches this position of level indicator 13, the conveying process is stopped. In order to prevent any particulate matter 5 reaching motor 14, a wider outlet is arranged at the termination of slot 12 of conveyor screw 11.

With this method, it is also possible to fill only a part of supply bin 6 for coating surfaces extending over a part of the coater's axis. Hence, if level indicator 13 is shifted towards the inlet of screw conveyor 11, the particulate matter 5 is supplied only up to the respective location and the conical pile ends at that position.

FIGS. 3A through 3D depict the slow process of filling supply bin 6 by means of screw conveyor 11, until the latter is shut down when triggered accordingly by level indicator 13.

FIGS. 3E through 3G depict the sequence whereby the quantity of particles decreases in the supply bin as particulate matter 5 is removed by plough 7, until level indicator 13 is triggered and thereafter supply bin 6 is refilled again from the right side of the figure.

Figure 4:
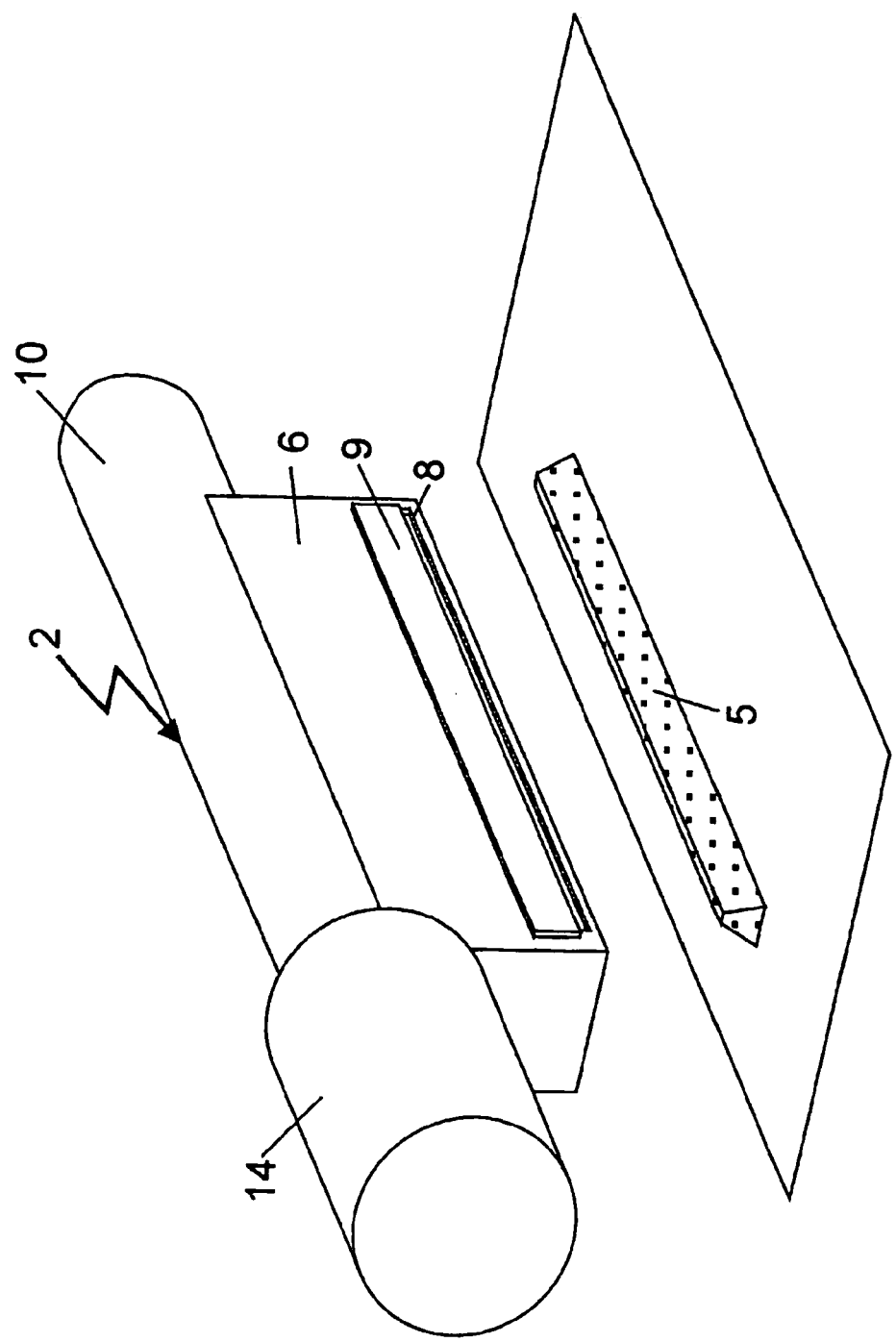
FIG. 4 is a 3-D view of the apparatus in accordance with the invention.

FIG. 4 is a 3-D illustration of the apparatus in accordance with the invention, where it can be clearly seen that this apparatus is especially suited for selective discharge of a predetermined quantity of the fluid along a straight line.

Typically, linear dispensing of particulate matter is problematic. A special problem relates to rapid prototyping processes in which one layer normally weighs only a few hundred grams, and this layer must be spread uniformly over the entire width of the coater, since particulate matter 5 is almost never spread crosswise after being dispensed into coater 1. It is evident from FIG. 4, where particulate matter 5 has been deposited for illustrative purposes on to a target surface instead of being dispensed into coater 1, that such uniform spreading becomes possible with the apparatus in accordance with the invention.

The invention claimed is:

1. An apparatus for dispensing particulate matter from a supply bin to a coater for rapid prototyping, comprising a plough that has a width essentially equal to that of the supply bin and laterally moves at least partially in and out of the supply bin and pushes the particulate matter from the supply bin, through an aperture in the supply bin, to the coater and which when the plough is retracted, pushes the particulate matter out of the supply bin across its width and closes the aperture in the supply bin, whereby there is an adequate quantity of the particulate matter above the plough, further wherein the aperture is dimensioned such that when the plough is at a protracted position outwards of the supply bin the particulate matter is hindered from flowing out due to a seal formed by an angle of repose of the particulate matter at the aperture.

2. An apparatus according to claim 1, wherein the aperture comprises a gate that can be adjusted in a direction perpendicular to a longitudinal axis of the aperture to change a size of the aperture.

3. An apparatus according to claim 1, wherein at least one wall of the supply bin is shaped such that it slants inwards.

4. An apparatus according to claim 1, wherein the supply bin comprises a vibrator.

5. An apparatus according to claim 1, arranged with a pneumatic means to move the plough.

6. An apparatus according to claim 1, wherein the supply bin comprises a level detector.

7. An apparatus according to claim 1, wherein the supply bin is arranged above a metering device in the coater.

8. An apparatus according to claim 1, wherein the aperture is dimensioned such that when the plough is at a protracted position outwards of the supply bin the particulate matter is hindered from flowing out due to a seal formed by an angle of repose of the particulate matter at the aperture and further wherein the aperture comprises a gate that is adjusted in a direction perpendicular to a longitudinal axis of the aperture to change a size of the aperture.

9. An apparatus according to claim 8, wherein at least one wall of the supply bin is shaped such that it slants inwards.

10. An apparatus according to claim 8, wherein the supply bin comprises a vibrator.

11. An apparatus according to claim 8, wherein the supply bin comprises a level detector.

12. An apparatus for dispensing particulate matter from a supply bin to a coater for rapid prototyping, comprising a plough that has a width essentially equal to that of the supply bin and laterally moves at least partially in and out of the supply bin and pushes the particulate matter from the supply bin, through an aperture in the supply bin, to the coater and which when the plough is retracted, pushes the particulate matter out of the supply bin across its width and closes the aperture in the supply bin, whereby there is an adequate quantity of the particulate matter above the plough, wherein below the supply bin is a metering device in the coater, which is used for dispensing the particulate matter on to a surface to be coated.

13. A method of rapid prototyping a part by filling a coater with a predetermined amount of a particulate matter from a supply bin comprising the steps of:
   a. providing a supply bin including a plough that is laterally movable at least partially in and out of the supply bin and which when the plough is fully retracted, closes an aperture in the supply bin;
   b. providing a coater located below the supply bin at least when the coater is being filled;
   c. providing a gate at the aperture that is adjusted in a direction perpendicular to a longitudinal axis of the aperture to change a size of the aperture;
   d. adjusting the gate to set a predetermined amount of the particulate matter to flow out the aperture into the coater;
   e. filling the supply bin with the particulate matter;
   f. protracting the plough at least partially from the supply bin;
   g. retracting the plough laterally into the supply bin, causing, via a pushing force of the plough, the predetermined amount of the particulate matter to flow out the aperture into the coater, thus filling the coater; and
   h. repeating steps a-g to form a rapid prototype part.

14. The method of claim 13, including the step of providing a vibrator with the supply bin and an optional step of vibrating the particulate matter to dislodge any particulate matter hung up in the supply bin.

* * * * *